(12) United States Patent
Schneider et al.

(10) Patent No.: US 11,551,035 B2
(45) Date of Patent: Jan. 10, 2023

(54) MACHINE LEARNING BASED ON HOMOMORPHIC ENCRYPTION

(71) Applicant: ABB Schweiz AG, Baden (CH)

(72) Inventors: Johannes Schneider, Feldkirch (AT);
Matus Harvan, Luxembourg (LU);
Sebastian Obermeier, Rietheim (CH);
Thomas Locher, Zürich (CH);
Yvonne-Anne Pignolet, Zürich (CH)

(73) Assignee: ABB SCHWEIZ AG, Baden (CH)

( * ) Notice: Subject to any disclaimer, the term of this patent is extended or adjusted under 35 U.S.C. 154(b) by 1164 days.

(21) Appl. No.: 16/055,705

(22) Filed: Aug. 6, 2018

(65) Prior Publication Data

US 2018/0349740 A1 Dec. 6, 2018

Related U.S. Application Data

(63) Continuation of application No. PCT/EP2017/052458, filed on Feb. 3, 2017.

(30) Foreign Application Priority Data

Feb. 4, 2016 (EP) ..................................... 16154245
Mar. 30, 2016 (EP) ..................................... 16163018

(51) Int. Cl.
*G06N 20/00* (2019.01)
*G06K 9/62* (2022.01)
(Continued)

(52) U.S. Cl.
CPC ........... *G06K 9/6257* (2013.01); *G06F 17/18* (2013.01); *G06N 20/00* (2019.01); *H04L 9/008* (2013.01);
(Continued)

(58) Field of Classification Search
CPC ...... G06K 9/6257; G06N 20/00; G06F 17/18; H04L 9/008; H04L 9/0618; H04L 2209/46; H04L 2209/76
See application file for complete search history.

(56) References Cited

U.S. PATENT DOCUMENTS

2005/0049990 A1* 3/2005 Milenova .............. G06F 16/284
706/45
2016/0350648 A1* 12/2016 Gilad-Bachrach ... G06N 3/0481
(Continued)

OTHER PUBLICATIONS

Zhang, Qingchen, Laurence T. Yang, and Zhikui Chen. "Privacy preserving deep computation model on cloud for big data feature learning." IEEE Transactions on Computers 65, No. 5 (2015): 1351-1362. (Year: 2015).*

(Continued)

*Primary Examiner* — Casey R. Garner
(74) *Attorney, Agent, or Firm* — Greenberg Traurig, LLP

(57) ABSTRACT

A method for evaluating data is based on a computational model, the computational model comprising model data, a training function and a prediction function. The method includes training the computational model by: receiving training data and training result data for training the computational model, and computing the model data from the training data and the training result data with the training function. The method includes predicting result data by: receiving field data for predicting result data; and computing the result data from the field data and the model data with the prediction function. The training data may be plaintext and the training result data may be encrypted with a homomorphic encryption algorithm, wherein the model data may be computed in encrypted form from the training data and the encrypted training result data with the training function. The field data may be plaintext, wherein the result data may be (Continued)

computed in encrypted form from the field data and the encrypted model data with the prediction function.

16 Claims, 1 Drawing Sheet

(51) Int. Cl.
    *H04L 9/00*     (2022.01)
    *G06F 17/18*     (2006.01)
    *H04L 9/06*     (2006.01)

(52) U.S. Cl.
    CPC ........ *H04L 9/0618* (2013.01); *H04L 2209/46* (2013.01); *H04L 2209/76* (2013.01)

(56) References Cited

U.S. PATENT DOCUMENTS

| | | | |
|---|---|---|---|
| 2017/0016430 A1* | 1/2017 | Swaminathan | ........ G06Q 50/06 |
| 2019/0036678 A1* | 1/2019 | Ahmed | ................. H04L 9/0631 |

OTHER PUBLICATIONS

Xie, Pengtao, Misha Bilenko, Tom Finley, Ran Gilad-Bachrach, Kristin Lauter, and Michael Naehrig. "Crypto-nets: Neural networks over encrypted data." arXiv preprint arXiv:1412.6181 (2014). (Year: 2014).*

Gong, Yanmin, Yuguang Fang, and Yuanxiong Guo. "Privacy-preserving collaborative learning for mobile health monitoring." In 2015 IEEE Global Communications Conference (GLOBECOM), pp. 1-6. IEEE, 2015. (Year: 2015).*

European Patent Office, Office Action issued in corresponding Application No. 17702412.2, dated Jun. 17, 2020, 9 pp.

De Cock et al., "Fast, Privacy Preserving Linear Regression over Distributed Datasets based on Pre-Distributed Data," Proceedings of the 8th ACM Workshop on Artificial Intelligence and Security, 2015, 12 pp.

Nikolaenko et al., "Privacy-Preserving Ridge Regression on Hundreds of Millions of Records," 2013 IEEE Symposium on Security and Privacy, May 19, 2013, pp. 334-348.

European Patent Office, International Search Report & Written Opinion issued in corresponding Application No. PCT/EP2017/052458, dated Apr. 18, 2017, 16 pp.

European Patent Office, International Preliminary Report on Patentability issued in corresponding Application No. PCT/EP2017/052458, dated Apr. 30, 2018, 21 pp.

European Patent Office, Written Opinion of the International Preliminary Examining Authority issued in corresponding Application No. PCT/EP2017/052458, dated Feb. 5, 2018, 9 pp.

European Patent Office, Extended Search Report issued in corresponding Application No. 16163018.1, dated Apr. 18, 2017, 10 pp.

Aono et al., "Fast and Secure Linear Regression and Biometric Authentication with Security Update," International Association for Cryptologic Research, vol. 20150730:012111, Jul. 30, 2015, pp. 1-29.

Chen et al., "Highly Efficient Linear Regression Outsourcing to a Cloud," IEEE Transactions on Cloud Computing, vol. 2, No. 4, Oct.-Dec. 2014, pp. 499-508.

Graepel et al., "ML Confidential: Machine Learning on Encrypted Data," Information Security and Cryptology ICISC 2012, Berlin, Heidelberg, pp. 1-21.

\* cited by examiner

MACHINE LEARNING BASED ON HOMOMORPHIC ENCRYPTION

FIELD OF THE INVENTION

The invention relates to the field of homomorphic encryption. In particular, the invention relates to a method, a computer program and a system for evaluating data based on a computational model.

BACKGROUND OF THE INVENTION

The computation of key performance indicators and of trend analysis requires to use machine learning techniques on various types of data, such as sensor data or weather data. Machining learning techniques may comprise linear regression, support vector machines, k-nearest neighbors, to name but a few. With those algorithms, a prediction model may be trained with the aid of training data and then this prediction model may be used to perform predictions on new data. In order to improve the precision of the predictions, it is desirable to train the model on a training data set that is as large as possible. This usually requires large amounts of computational resources.

Cloud Computing may offer such resources in an economically attractive way by providing access to a shared pool of configurable and inexpensive computing and storage resources to store and process data in third-party data centers. However, some of the data input and/or produced by these algorithms may be confidential.

Sending business-relevant data to a third-party cloud provider requires trust. In order to circumvent the trust issue, it may be possible to encrypt the confidential data before sending it to the cloud. If the data should also be processed in the cloud, then commonly used encryptions schemes, such as AES, DES, blowfish, require the data to be decrypted before it can be processed. In these cases, either the user stores the encryption keys in the cloud, where the cloud provider may use the keys to decrypt the data, or the user downloads the encrypted data from the cloud, decrypts it, and processes it locally, so the computational resources of the cloud are not utilized.

Another approach is to use homomorphic encryption schemes, which enable the processing of data in the cloud without providing decryption keys to the cloud provider. With homomorphic encryption it is possible to carry out computations, such as machine learning techniques, on data that is stored in encrypted form. However, known approaches for such computations on encrypted data slow down the computations to such an extent that the computations become impractical.

DESCRIPTION OF THE INVENTION

It is an objective of the invention to provide secure and computational feasible machine learning techniques that may be executed in a cloud computing system.

This objective is achieved by the subject-matter of the independent claims. Further exemplary embodiments are evident from the dependent claims and the following description.

An aspect of the invention relates to a method for evaluating data based on a computational model, the computational model comprising model data, a training function and a prediction function. With the training function, the model may be trained with training data, and with the prediction function, predictions may be made based on new data. The computational model may be seen as a machine learning technique, since it encodes its knowledge about the training data in the model data. The computational model may model a real system, such as a wind park or a plurality of solar cell panels at distributed locations. For example, the computational model may predict the power output of a wind park or the plurality of solar cell panels based on weather data.

In general, the training of the computational model and the predictions may be computed mainly on an evaluation system with big computing resources, such as a cloud computing facility. It may be possible that some of the calculations, which need a decryption of data, are performed on a client device. However, most of the computations may be provided by the evaluation system. Thus, the computations "mainly" may be performed in the evaluation system. In the evaluation system, no encryption or decryption of data may take place.

According to an embodiment of the invention, the method comprises training the computational model by: receiving training data and training result data for training the model, and computing the model data from the training data and the training result data with the training function. The training data may be data representing data that may be generated by devices, which determine specific parameters relating to a real system, such as devices acquiring weather data. The training result data may be data representing the result the computational model should generate when the training data is applied to the prediction function.

For example, a client device, which may be communicatively connected with the evaluation device, may send the training data and the training result data to the evaluation system, where the model data is mainly computed.

According to an embodiment of the invention, the method comprises predicting result data by: receiving field data for predicting result data, and computing the result data from the field data and the model data with the prediction function. While the training data and the training result data is used for training the model, i.e. computing the model data, the field data is data used for computing the result data based on the model data. Field data may be real data collected by external devices.

The field data may be data corresponding to the training data, i.e. may have the format and/or an analogous information content. For example, the field data may be collected by one or a plurality of devices, which may be seen as collection device, and may be sent to the evaluation system, where the predictions are mainly calculated. For example, the collection device(s) may be device(s) of weather forecast provider(s). The result data may be data corresponding to the training result data, i.e. may have the format and/or an analogous information content. For example, the result data may encode the power output of wind parks and/or solar panels, which has been predicted from weather forecast data as field data.

The result data may be sent to the client device, which has provided the training data and the training result data, or to another client device.

The training and the prediction may take place on encrypted data, which is processed based on homomorphic encryption. Homomorphic encryption provides the possibility that calculations may be based on plaintext data and encrypted data simultaneously. There may be one or more functions mapping a plaintext first data value and an encrypted second data value to an encrypted result data value, which are compatible with the encryption. When the result data value is decrypted, it may have the same value, as when a specific other function, such as addition or multiplication, is applied to the first data value and the encrypted second data value.

With such functions compatible with homomorphic encryption, it may be possible that not all of the three sets of data during training and prediction, i.e. training data or field data, training result data or result data, and model data, are encrypted but only two of the three sets of data. In such a way, computational power may be saved while preserving data confidentiality.

In general, with the method, computations for machine learning algorithms may be performed on encrypted data to achieve a level of performance that makes their application on encrypted data practically feasible. With the method, only a part of the data is encrypted. This may be applicable in settings where a part of the data is publicly available, such as weather and/or wind data, and other data is confidential, for example, the power output of a wind farm.

According to an embodiment of the invention, the training data is plaintext and the training result data is encrypted with a homomorphic encryption algorithm, wherein the model data is computed in encrypted form from the training data and encrypted training result data with the training function; and the field data is plaintext, wherein the result data is computed in encrypted form from the field data and the encrypted model data with the prediction function. In other words, the input data to the training function and the prediction data is plaintext, while the model data and the output data of training function and the prediction function is encrypted.

Since the input data, i.e. training data and field data, is usually the larger data set, this may additionally save computational power for encryption. Furthermore, the collection of devices need not provide the ability to encrypt data.

According to an embodiment of the invention, the training data and the training result data are encrypted with a homomorphic encryption algorithm, wherein the model data is computed in plaintext from the encrypted training data and the encrypted training result data with the training function; and the field data is encrypted with the homomorphic encryption algorithm, wherein the result data is computed in encrypted form from the encrypted field data and the plaintext model data with the prediction function. Here, only the input data and the output data of the training function and the prediction function are encrypted, while the model may stay in plaintext. This may have the additional advantage that only encrypted data has to be transmitted via communication lines, such as the internet.

According to an embodiment of the invention, the homomorphic encryption algorithm is additively homomorphic and multiplicative homomorphic for multiplication with a plaintext factor. For example, the Paillier cryptosystem, which is a homomorphic encryption algorithm, has such a property. Multiplication of two encrypted values may result in an encrypted value representing the sum of the two corresponding plaintext values. An encrypted value raised to the power with a plaintext exponent, results in an encrypted value representing the multiplication of the exponent with the corresponding plaintext value.

According to an embodiment of the invention, the training function is a polynomial in at least one of the training data and the training result data and/or the prediction function is a polynomial in at least one of the field data and model data. At least for polynomial functions, which only comprise additions and multiplications, a calculation scheme may be found, in which the plaintext data is only multiplied with the encrypted data and the multiplicative homomorphism for multiplication with a plaintext factor may be used.

According to an embodiment of the invention, each of the training data and the field data is a set of vectors or matrices of data values. Each of the training result data and the result data may be a vector of result data values. The model data may be a vector of model data values. In general, the training data and the field data may be provided as a set of m samples, wherein each sample comprises a vector of n values. The training result data and the result data may be provided as m values. The model data may be provided as a set of n values, which, for example, may be used for determining a value of the result data based on a vector of field data.

According to an embodiment of the invention, the model is a linear regression model, in which the prediction function is a linear function in the field data and the model data. A linear regression model is a model, in which a relation between the training data and field data and the corresponding result data is assumed to be linear. For linear regression, the model data is found that minimizes the deviation of the training data from a linear relationship.

The training function of the linear regression model may be based on minimizing a cost function, which quadratically minimizes a difference between the prediction function and the training result data.

For example, the training function may be the normal equation for inverting the prediction function based on minimizing the cost function. Thus, for calculating the model data, a in general rather big matrix has to be inverted.

The training function also may be a gradient descent function for iteratively inverting the prediction function based on minimizing the cost function. In this case, a in general rather large number of iterations have to be performed for calculating the model data.

According to an embodiment of the invention, before encryption, data values from the training data and/or the training result data are approximated by multiplication with an approximation factor and rounding to a closest integer. In such a way, rounding errors of the operations performed on encrypted data may be controlled. In particular, the homomorphic encryption algorithm may be based on a finite field based on the product of two prime numbers and the approximation factor is smaller than this product. One divided by the approximation factor may be seen as the smallest possible increment, which defines the precision. Furthermore, the product of the two prime numbers divided by the approximation factor may be seen as the largest possible value.

According to an embodiment of the invention, the training function for computing the model data is iteratively updated with the training data and the training result data. For example, this may be the case when gradient descent is used. The training function may be an equation in which a next value of the model data is computed by adding or subtracting a correction factor multiplied by a convergence factor to an actual value of the model data. The correction factor is calculated from the training result data and the actual model data. The convergence factor may comprise or may be a parameter divided by the number m of samples of the training data.

According to an embodiment of the invention, in each iteration, the training function is evaluated in an evaluation server device, the updated model data, i.e. the correction factor, is sent to a secure device, decrypted, multiplied with a convergence factor and encrypted in the secure device and sent back to evaluation server device.

The correction factor only may comprise additions and multiplications with values from the actual training data, training result data and model data, which all may be approximated to integers as described above. The convergence factor may be a rather small value, which would result in a loss of precision when multiplied in approximated form, i.e. multiplied with the approximation factor and rounded to integer to the correction factor. Thus, this multiplication may be performed in decrypted form on the secure device.

The server device may be a device with high computing power, but which may be rated as unsecure. The secure device may be a client device with much less computing power, but which is rated as secure. Thus, computational computing power may be provided by the server device, where most of the calculations are performed. The secure device may provide much less computational power than the server device. However, the much fewer operations, which need higher precision, may be performed with the secure device.

According to an embodiment of the invention, the training data and/or the training result data is provided by a client device communicatively interconnected with an evaluation server device, wherein the client device encrypts the training data and/or the training result data and/or decrypts the result data and wherein the evaluation server device at least partially computes the model data and/or the result data. In such a way, the client device, which may be a secure device, only or nearly only has to perform the encryption and decryption, while the computational more demanding operations may all be performed in a secure way on the server device.

According to an embodiment of the invention, the field data is provided by at least one or a plurality of devices communicatively interconnected with the evaluation server device. Also the field devices only may have to perform the encryption of field data. The one or more devices may be field devices directly acquiring sensor data as field data. The client device providing the training data also may be the device providing the field data.

According to an embodiment of the invention, the training data and the field data encodes local wind speed and/or local sunshine intensity and the training result data and the result data encodes electrical power production of wind turbine facilities and/or solar energy facilities. One application of the method may be the secure computation of forecast data for electrical power networks. A forecast of the power output of a plurality of the renewable power sources may be calculated in a cloud computing facility without the danger of publishing training data and/or model data to third parties. Such forecasts may be important for predicting prices when electrical power is traded.

A further aspect of the invention relates to a computer program for evaluating data based on a computational model, which, when executed on an evaluation system, is adapted for performing the method as described above and in the following, as well as to a computer-readable medium on which such a computer program is stored. A computer-readable medium may be a floppy disk, a hard disk, an USB (Universal Serial Bus) storage device, a RAM (Random Access Memory), a ROM (Read Only Memory), an EPROM (Erasable Programmable Read Only Memory) or a FLASH memory. A computer-readable medium may also be a data communication network, e.g. the Internet, which allows downloading a program code. In general, the computer-readable medium may be a non-transitory or transitory medium.

A further aspect of the invention relates to an evaluation system adapted for performing the method as described above and in the following.

According to an embodiment of the invention, the system comprises an evaluation server device, which may be a cloud computing system/facility. The server device needs not be secure, i.e. restricted from access from third parties, since all of the operations may be performed in encrypted form in the server device. Additionally, the model data may be stored in the server device only in encrypted form.

The evaluation system furthermore may comprise a client device communicatively interconnected with the server device. This client device may be a secure device and may provide the training data and training result data to the server device. The client device may be a secure device adapted for encrypting and decrypting the training data, training result data and/or result data. The client device need not be adapted for performing calculations with high computational power.

The evaluation system furthermore may comprise a plurality of field devices communicatively interconnected with the server device, which may provide field data to the server device. These field devices may only be adapted for encrypting field data, but need not be adapted for decrypting field data and/or for performing calculations with high computational power.

It has to be understood that features of the method as described in the above and in the following may be features of the computer program, the computer-readable medium and evaluation system as described in the above and in the following, and vice versa.

These and other aspects of the invention will be apparent from and elucidated with reference to the embodiments described hereinafter.

BRIEF DESCRIPTION OF THE DRAWINGS

The subject-matter of the invention will be explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION OF EXEMPLARY EMBODIMENTS

Figure 1:
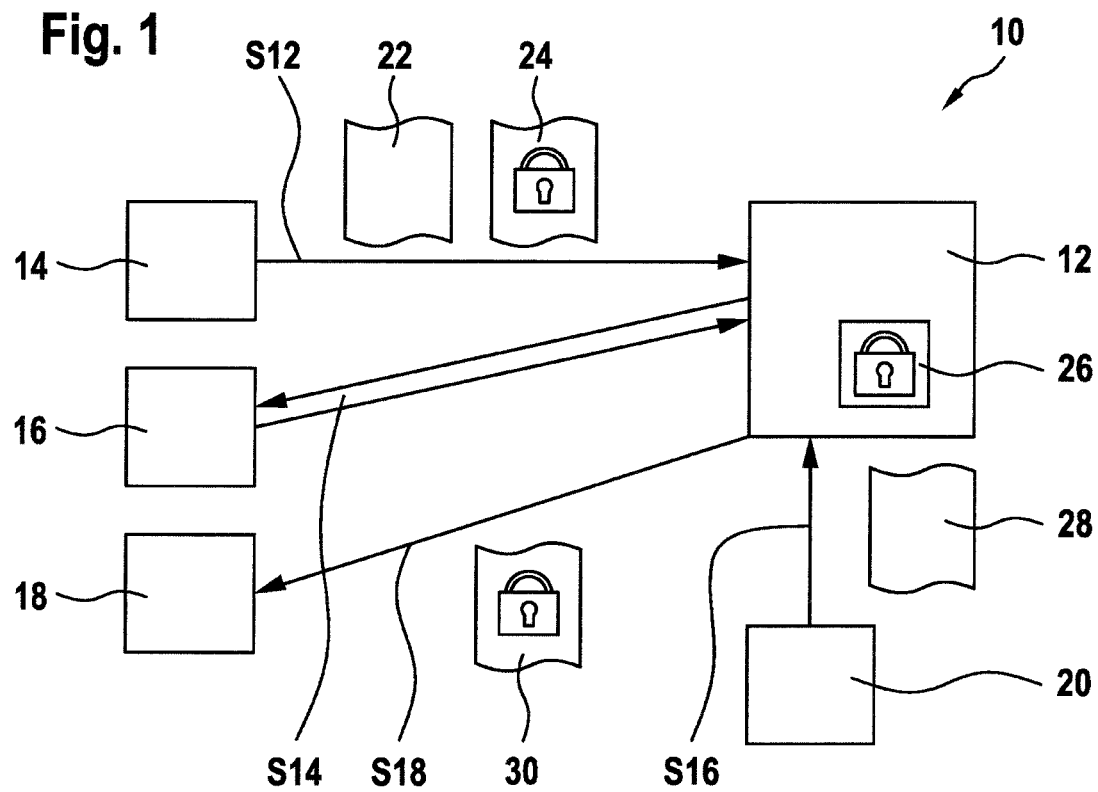
FIG. 1 schematically shows a system evaluation system according to an embodiment of the invention and illustrates a method for evaluating data based on a computational model system according to an embodiment of the invention.
Figure 2:
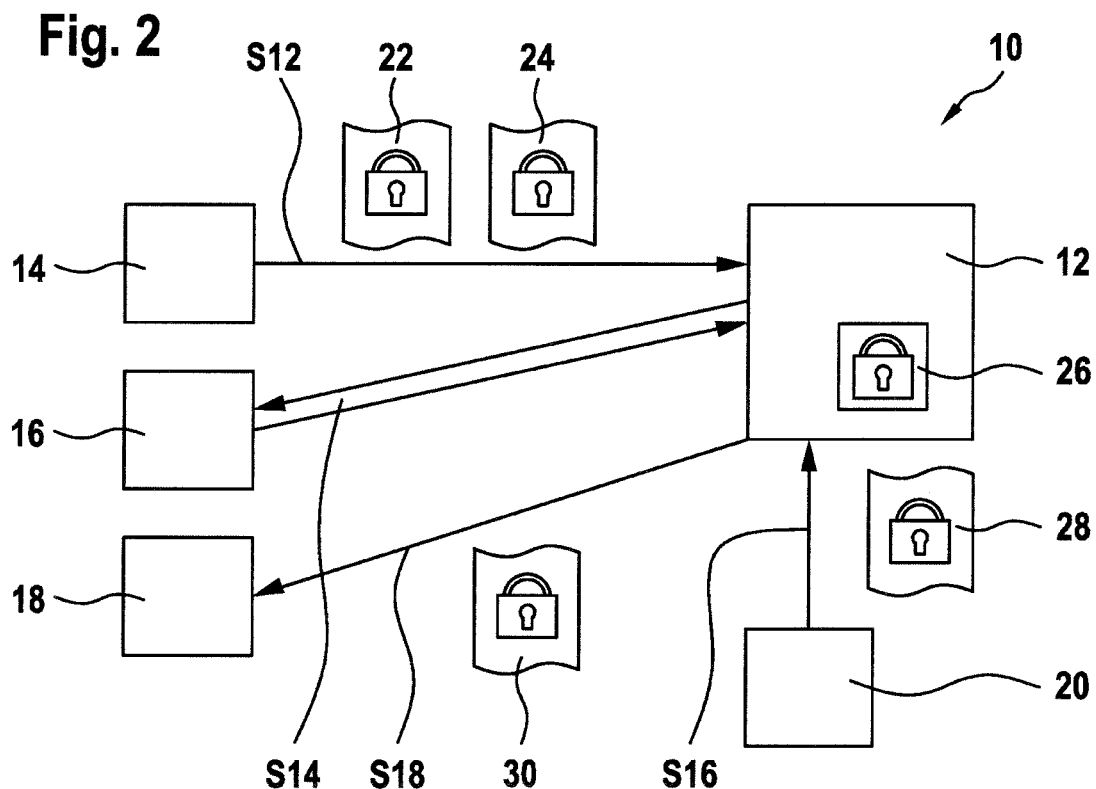
FIG. 2 schematically shows a system evaluation system according to a further embodiment of the invention and illustrates a method for evaluating data based on a computational model system according to a further embodiment of the invention.

FIG. 1 and FIG. 2 show an evaluation system 10 comprising a server device 12, which may be a cloud computing facility. The system 10 furthermore comprises several computing devices 14, 16, 18 and 20, which are communicatively interconnected with the server device 12, for example via Internet. The arrows in FIG. 1 illustrate method steps that will be described in more detail below. The direction of these arrows illustrates a possible data flow between the server device 12 and the computing devices 16, 18, 20.

The training device 14 may be adapted for encrypting data with a homomorphic encryption algorithm, for example based on the Paillier encryption scheme, and may be adapted for sending plaintext, i.e. unencrypted, data and encrypted data to the server device 12.

In a first method step S12, the training device 14 sends training data 22 and training result data 24 to the server device 12, which trains a computational model by receiving the training data 22 and training result data 24 and by computing model data 26 from the training data 22 and the training result 24 data with a training function.

The computational model may comprise the model data 26, the training function used during a training phase and a prediction function used during a prediction phase of the method.

On the server device 12, no data is encrypted and decrypted. Only homomorphic operations compatible with the homomorphic encryption scheme are applied to the data 22, 24, 26.

The evaluation system 10 may comprise a secure device 16, which is adapted for encrypting and decrypting data with the homomorphic encryption algorithm. The term "secure" refers to the fact that the server device 12 needs not be secured with respect to third parties, i.e. it needs not be protected from an illegal access of third parties, which are interested in reading information from the data. Contrary to the server device 12, the devices 14, 16, 18 may be seen as "secure", since they may store and/or process confidential data in plaintext form.

During the step S12, when the server device 12 computes the model data 26, this may be performed iteratively and the server device 12 may send partial results in a step S14 to the secure device 16, which decrypts the partial results, performs calculations with the partial results, encrypts the calculation results and sends them back to the server device 12. It has to be noted that most of the calculations, such as more than 95% or more than 99%, may be performed in the server device 12 and only the rest may be performed by the secure device 16.

The secure device 16 and the training device 14 may be provided by the same computational hardware.

Step S12 and S14 refer to a training phase of the computational model. After the training phase, model data 26 may be stored, in for example encrypted or decrypted form, in the server device 12.

The evaluation system 10 also may comprise one or more field devices 20, which are adapted for sending field data 28 to the server device 12. The field data may be encrypted or in plaintext, in the first case, the one or more field devices 20 may be adapted for encrypting field data 28 with the homomorphic encryption algorithm.

In step S16, the one or more field devices 20 send the field data 28 to the server device, which predicts result data 30 by receiving field data 28 and computing the result data 30 from the field data 28 and the model data with the prediction function.

In step S18, the result data 30 is sent from the server device 12 to a beneficiary device 18, which is adapted for decrypting the result data 30, which then may be further processed. The beneficiary device 18 may be provided by the same computational hardware as the training device 14 and/or the secure device 16.

In both of the systems 10 of FIG. 1 and FIG. 2, only a part of the data 22, 24, 26, 28, 30 is encrypted to save computational power.

In FIG. 1, the training data 22 is plaintext and the training result data 24 is encrypted with the homomorphic encryption algorithm, wherein the model data 26 is computed in encrypted form from the training data 22 and the encrypted training result data 24 with the training function. Furthermore, the field data 28 is plaintext, wherein the result data 30 is computed in encrypted form from the field data 28 and the encrypted model data 26 with the prediction function.

In the training phase, i.e. step S12 and optionally S14 encrypted model data 26 is computed in the server device 12 based on unencrypted, non-critical training data 22, which may be old field data, and encrypted, confidential training result data 24, which corresponds to the training data 22. In the prediction phase, i.e. steps S16 and S18, new field data 28 is sent to the server device 12, for example from arbitrary devices 20 at arbitrary locations. The server device 12 uses the encrypted model data 26 to compute encrypted predictions/result data 30 based on the new field data 28.

In FIG. 2, the training data 22 and the training result data 24 are encrypted with the homomorphic encryption algorithm, wherein the model data 26 is computed in plaintext from the encrypted training data 22 and the encrypted training result data 24 with the training function. Furthermore, the field data 28 is encrypted with the homomorphic encryption algorithm, wherein the result data 30 is computed in encrypted form from the encrypted field data 28 and the plaintext model data 26 with the prediction function.

The method and system of FIG. 1 is more suitable when the training data 22 and/or field data 28 is confidential as well. The model data 26 of the training phase, however, is not encrypted. This may not be a security issue as the computed parameters in the model data 26 only may make sense with respect to the encrypted data 22, 24 or 28, 30. Furthermore, the provider of the server device 12 cannot abuse its knowledge of the model data 26 because it cannot decrypt the result data 30.

In both FIGS. 1 and 2, the result data 30 may be sent to the client 18, where they may be decrypted and consumed, for example archived, displayed, or further processed.

Typically, the training phase may be much more expensive in computational power. The model data 26 may be obtained once and then used several times. It also may be possible that new model data 26 is obtained periodically.

By only encrypting two out of the three parts, input data 22, 28, model data 26 and output data 24, 30 substantial performance improvements are possible, which enable practical privacy-preserving model data 26 and result data 30 computations for remote service applications. For the computations in the server device 12, a homomorphic encryption scheme can be used that usually only offers a small set of operations that can be carried out on encrypted data. However, these operations suffice to compute model data 26 and result data 30 as shown in the following.

If all three parts were encrypted, much more expensive, for example fully homomorphic encryption schemes may have to be used, degrading performance to the point where remote computation of model data 26 and result data 30 may become impractical.

In the following, an embodiment to linear regression as computational model is described that may be generalized to other computational models based on model data 26, a training function and a prediction function.

The Computational Model

As already mentioned, the computational model comprises model data 26, a training function $f$ and a prediction function $g$.

During the training phase, i.e. steps S12, S14, the model data 26 is fitted to the training data 22 and the training result data 24 according to the training function $f$. The training data 22 may comprise m samples, where each sample i contains a vector $x^{(i)}$ of n features/data values. The training data 22, as well as the field data 28, may be seen as independent variables. The training result data 24, as well as the result data 30, may comprise m scalars $y^{(i)}$, which also may be seen as a vector and/or may constitute the dependent variable. Let X and y denote the matrix and the vector of all independent and dependent variables, respectively. Then the model data 26 may be provided by a vector θ may be computed in the training phase by θ=$f$(X,y).

During the training phase, i.e. steps S14, S16, the model data 26, θ is computed from known X and y, to predict the dependent variable for new independent variables. The field data 28 and the result data 30 may have the same format as the data 22, 24 and also may be denoted by X and y. Then, the result data 30, y may be computed through the prediction function g based on the vector X of independent variables and the model data θ:y=g(x,θ).

In general, the method may be performed when the functions $f$ and g are or can be approximated by a bounded-degree polynomial.

In order to ensure that the server device 12 learns as little as possible during the course of the computation, data is encrypted before being transmitted. Note that when using asymmetric cryptography, only the secure device 16 and/or the beneficiary device 18 needs access to a secret key. The devices 14 and 20 solely may use a public key for encryption.

The homomorphic encryption scheme used in the following will be additively homomorphic, i.e., sums can be computed on encrypted values directly without access to the decryption key. Formally, let $[v]_k$ denote the encrypted value corresponding to the plaintext value v encrypted with key k. An encryption scheme may be called additively homomorphic if there is an operator ⊕ such that $[v_1]_k ⊕ [v_2]_k$ is an encryption of $v_1+v_2$ for any key k and values $v_1$ and $v_2$. Note that there may be many valid encrypted values corresponding to the same plaintext value so it may not be assumed that $[v_1]_k ⊕ [v_2]_k = [v_1+v_2]_k$. Since it is always clear from the context which key is used, we omit the index and simply write [v].

Furthermore, the homomorphic encryption scheme may be homomorphic multiplicative with respect to multiplication of an encrypted value with a plaintext value, resulting in an encryption of the product of the encrypted value and the plaintext value.

Several known additively homomorphic encryption schemes, such as Paillier, support these operations. In the following, homomorphic operators are used implicitly whenever at least one operand is encrypted, e.g., $[v_1]+[v_2]$ and $v_1[v_2]$ denote the homomorphic addition, where both terms are encrypted, and multiplication, where one of the terms is encrypted, respectively.

Linear Regression

Linear regression may be seen as a method to compute model data 26, θ representing a best-fit linear relation between the training data 22, $x^{(i)}$ and training result data 24, $y^{(i)}$, resulting in $x^{(i)} \cdot \theta = y^{(i)} + e^{(i)}$ for all i∈{1, ..., m}, where $e^{(i)}$ are error terms and the operation on the left-hand side denotes a scalar product. The model data 26, θ should minimize the cost function $$J(\theta) := \frac{1}{2m} \sum_{i=1}^{m} (x^{(i)} \cdot \theta - y^{(i)})^2.$$

The model data, θ can then be used to predict result data 30, y from field data 28, i.e. vectors x, matrix X, that are obtained later by computing the prediction function y=g(x, θ)=x·θ.

Several approaches may be used to compute the model data 26, θ in such a way that the cost function J(θ) is minimized.

In one approach, the normal equation $\theta = (X^T X)^{-1} X^T y = My$ is solved. In this approach, the matrix $(X^T X)$ has to be inverted on the server device 12.

Another approach is called gradient descent. In the gradient descent-based approach, the model data 26, θ is updated iteratively, using the derivative of the cost function J(θ), until the cost function J(θ) converges to a small value as follows:

$$\theta_j := \theta_j - \alpha \frac{\partial J}{\partial \theta_j} = \theta_j - \alpha \frac{1}{m} \sum_{i=1}^{m} (x^{(i)} \cdot \theta - y^{(i)}) x_j^{(i)} \quad (1)$$

The parameter a influences the rate of convergence. The approach with normal equation requires the inversion of an n×n-matrix. Therefore, gradient descent can be significantly faster when the number of features/data values is large.

Approximation

For all calculations having nearly the same precision, data values should have a similar scale. It my be assumed that the numerical data values in the data 22, 24, 26, 28, 30 are normalized, i.e., the mean μ is shifted to 0 and all values are scaled to be in the range [−1,1]. The normalization may be performed by setting $$x_i \leftarrow \frac{x_i - \mu}{\max\{x_{max} - \mu, \mu - x_{min}\}}$$

for all i∈{1, ..., m}, where $x_{max}$ and $x_{min}$ are the bonds of the data values.

This feature scaling and fractional numbers in general may pose a problem when working with encrypted data 22, 24, 26, 28 as most homomorphic encryption schemes operate on integers in a finite field, for example based on the product of two large prime numbers.

Thus, the normalized data values may be transformed into fixed-point numbers before they are encrypted and processed. In an approximation step, each normalized data value may be multiplied with a large approximation factor and then rounded to the closest integer, before encrypting the data values. The magnitude of the approximation factor may have an impact on the achievable precision.

The approximation step may be denoted by $\hat{x}$:=approximate(x,λ), where x is the independent variable, such as training data 22 and field data 26, λ is the approximation factor that is multiplied with x, and $\hat{x}$ is the rounded result. The loss in precision may become negligible when the approximation factor λ is large enough.

Training Phase: Encrypted Model Data 26, θ and Encrypted Training Result Data 24, y Using Gradient Descent In this case, in step S12, the training device 14 may send the training data 22, for example as matrix X, in plaintext and the corresponding training result data 24, for example as vector y, in encrypted approximate form ([ŷ]) to the server device 12. Thus, the training device 14 may send mn plaintext values and m encrypted values. The server device 12 then may apply equation (1) iteratively on the data 22, 24. To this end, server device 12 may perform the approximation for $X^T X$ and $X^T$:

$$M:=\text{approximate}(X^T X, \lambda)$$

$$T:=\text{approximate}(X^T, \lambda)$$

Subsequently, the server device 12 may compute a correction factor $[r_1]:=M[\theta_0]-T[\hat{y}]$, where the initial model data $\theta_0$ may be set to a suitable starting vector in encrypted form. For example, this may be an initial model data $\theta_0$ already stored in the server device 12 or may be sent from the training device 14 to the server device 12.

In step S14, the server device 12 may send the correction factor $[r_1]$ to the secure device 16, which decrypts it, applies the multiplication with a convergence factor $\alpha/m$, encrypts it and sends back the result. This operation may be assigned to the secure device 16, since the convergence factor $\alpha/m$ is a number close to zero, if there are many samples, and thus the precision loss by carrying out this multiplication on the server device 12 may be significant.

The computation of the correction factor $[r_i]:=M[\theta_{i-1}]-T[\hat{y}]$ by the server device 12, the multiplication by the convergence factor $d_i=\alpha/mr_i$ by the secure device 16 and the calculation of the next model data 26 by $[\theta_i]:=[\theta_{i-1}]-[r_i]$ by the server device 12 may be repeated K times, where K may be a fixed value and/or may be repeated until the secure device 16 decides that the value of the difference of the actual correction factor and the last correction factor is smaller than a threshold value.

In each iteration, 2n encrypted values are transmitted from the server device 12 to the secure device 16 and back. Thus, O(Kn) encrypted values are exchanged during gradient descent. Overall, the server device 12 must perform O(Kmn) homomorphic operations and O(Kn) operations on plaintext, whereas the secure device 16 carries out O(Kn) plaintext, encryption, and decryption operations.

Training Phase: Encrypted Model Data 26, $\theta$ and Encrypted Training Result Data 24, y Using Normal Equation As already mentioned, another approach is to solve the normal equation on the server device 12 directly. No interaction with a secure device 16 may be necessary after receiving the training data 22, for example as matrix X, in plaintext and the corresponding training result data 24, for example as vector y, in encrypted approximate form ($[\hat{y}]$) in the server device 12.

Given the training data 22, X and the approximation factor $\lambda$, S first computes $(X^T X)^{-1} X^T$ and applies the subroutine approximate: $A:=\text{approximate}((X^T X)^{-1} X^T, \lambda)$.

The server device then uses the matrix A together with $[\hat{y}]$ to compute $[\theta]:[\theta]:=A[\hat{y}]$.

Overall, $O(mn^2+n^{2.373})$ plaintext operations are performed to compute A. The second term is the complexity of inverting $X^T X$ for optimized variants of the Coppersmith-Winograd algorithm.

For problems with a large number of features, the inversion can be computed by other methods, e.g., with LU decompositions. In addition, O(nm) homomorphic operations, i.e. additions of encrypted values and multiplications of encrypted values with plaintext values, are needed to compute $[\theta]$. If n is relatively small, e.g., 1000 or less, the homomorphic operations are likely to dominate the computational complexity as they may be typically several orders of magnitude slower than equivalent operations in the plaintext domain.

Training Phase: Encrypted Model Data 26, $\theta$ and Encrypted Training Result Data 24, y Using Normal Equation with Preprocessing A third approach is also based on solving the normal equation but reduces the number of homomorphic operations on the server device 12 for the case when the number of samples m is greater than the number of features n.

This reduction is achieved by preprocessing the training data 22, X and the training result data 24, y by the training device 14 as follows. As before, the training device 14 sends the matrix X to the server device 12. However, instead of sending the decrypted training result data 24, $[\hat{y}]$ directly, the training device 24 sends preprocessed and encrypted training result data 24, $[\hat{b}_i]$ to the server device 12.

In particular, the training device 24 computes $b_i:=X^{(i)^T} y^{(i)}$, where $X^{(i)}$ denotes the $i^{th}$ row of X, and transmits $[\hat{b}_i]$ for each $i \in \{1, \ldots, m\}$ to the server device 12.

Then, the server device 12 computes $A:=\text{approximate}((X^T X)^{-1}, \lambda)$. Next, the server device 12, homomorphically sums up the vectors $[\hat{b}_i]$ for all $i \in \{1, \ldots, m\}$ which yields the encrypted vector $[\hat{b}]$, where $b=X^T y$: $[\hat{b}]:=\sum_{i=1}^{m}[\hat{b}_i]$.

Finally, the model data 24, $\theta$ is computed by multiplying A and $[\hat{b}]$ homomorphically: $[\theta]:=A[\hat{b}]$.

If m>n, the advantage of the present approach as opposed to the previous approach is that the number of homomorphic multiplications on the server device 12 may be reduced from O(nm) to $O(n^2)$. Conversely, the training device 14 may have to perform O(nm) additional operations to compute the vectors of the preprocessed training result data 24, $[\hat{b}_1], \ldots, [\hat{b}_m]$. In addition to transmitting the plaintext matrix X the training device 14 also sends these mn-dimensional vectors, i.e., O(mn) values in total.

Since each vector $[\hat{b}_i]$ of training result data 24 may be sent individually, the method of the present approach may be performed by multiple clients as training device 14. If there is only one client that holds the training data 22, X and the training result data 24, y locally, the method may be optimized: The training device 14 computes $b=X^T y$ directly and sends $[\hat{b}]$ to the server device 12. In this case, the client must only encrypt $\hat{b}$, i.e., n values in total, in contrast to encrypting all vectors $\hat{b}_i$, which requires the encryption of nm values. Moreover, S would not have to compute $[\hat{b}]$.

Training Phase: Encrypted Training Data 22, X and Encrypted Training Result Data 24, y Using Gradient Descent With respect to FIG. 2, the training data 22, X and training result data 24, y are encrypted and the model data $\theta$ is computed in plaintext.

Solving the normal equation directly involves the multiplication of values of training data 22, X and the training result data 24, y, which may not be possible using an only additively homomorphic encryption scheme. Gradient descent may not be used directly either because $X^T$ must be multiplied with terms containing X and y.

However, gradient descent may be used when the training device 14 performs some preprocessing on the data 22, 24: For each sample i, the training device 14 prepares a vector $[\hat{b}_i]$, where $b_i=X^{(i)^T} y^{(i)}$, and matrix $[\hat{A}_i]$, where $A_i=x^{(i)^T} x^{(i)}$, and transmits them to the server device 12.

As above, the initial model data 26, $\theta_0$ may be set to a suitable starting vector. In order to support values smaller than 1 in the model data 26, $\theta_0$ may be scaled by $\lambda$.

The server device 12 then sums up all received encrypted vectors $[\hat{b}_i]$ and multiplies the sum with $\lambda$ homomorphically, resulting in the encrypted vector $[\hat{b}]$. The encrypted matrices $[\hat{A}_i]$ are also summed up by the server device 12 homomorphically, which yields the encrypted matrix $[\hat{A}]$.

Vector [b̂] and matrix [Â] are used in each iteration i as follows: The server device 12 sends $[r_i]:=[\hat{A}]\theta_{i-1}-[\hat{b}]$ to the secure device 16, where it is decrypted and multiplied with α/m before being converted again to an integer using approximate. The result $\hat{d}_i$ is encrypted and sent back to the server device 12. The updated model data 26, $\theta_i$ is computed by subtracting $[\hat{d}_1]$ from $\theta_{i-1}$.

Again, due to the homomorphic property of the encryption scheme, we have that $$\hat{A} = \sum_{i=1}^{m} \hat{A}_i \simeq \lambda \sum_{i=1}^{m} A_i = \lambda X^T X \qquad (2)$$

$$\hat{b} = \lambda \sum_{i=1}^{m} \hat{b}_i \simeq \lambda^2 \sum_{i=1}^{m} b_i = \lambda^2 X^T y,\qquad (3)$$

and thus $$r_i' \simeq \frac{1}{\lambda^2} r_i = \frac{1}{\lambda^2}(\hat{A}\theta_{i-1} - \hat{b}) \stackrel{(2),(3)}{\simeq} X^T X \theta_{i-1} - X^T y,$$

where $r_i$ denotes the correct difference between the two terms on the right-hand side. Hence, the algorithm implements gradient descent correctly.

As far as the computational complexity is concerned, the server device 12 carries out $O(mn^2+Kn^2)$ homomorphic additions and $O(Kn^2)$ homomorphic multiplications. At the beginning, the training device 14 sends $m(n^2+n)$ encrypted values. 2n encrypted values are exchanged in each iteration with the secure device 16, which has to decrypt them, carry out a multiplication, and encrypt them again before sending them back to the server device 12. Thus, $O(mn^2+Kn)$ values are exchanged in total.

Prediction Phase

In both cases, having computed the model data 26, the second task is to predict the result data 30, y given field data 28, x.

With respect to FIG. 1, the field data 28, x is not encrypted and the model data 26, θ is encrypted. The server device 12 may then compute encrypted result data 30 by computing $[y]=g(x,[\theta])=x[\theta]$, where only multiplications with a plaintext factor have to be computed.

With respect to FIG. 2, the field data 28, x is encrypted and the model data 26, θ is not encrypted. The server device 12 may then compute encrypted result data 30 by computing $[y]=g([x],\theta)=[x]\theta$, where again only multiplications with a plaintext factor have to be computed.

In both scenarios, the server device 12 needs O(n) homomorphic operations to compute the result data 30.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SYMBOLS 10 evaluation system
12 server device
14 training device
16 secure device
18 beneficiary device
20 field device
22 training data
24 training result data
26 model data
28 field data
30 result data

The invention claimed is:

1. A method for evaluating data based on a computational model, the computational model comprising model data, a training function and a prediction function, the method comprising:
   training the computational model by:
      receiving training data and training result data for training the computational model;
      computing the model data from the training data and the training result data with the training function;
   predicting result data by:
      receiving field data for predicting result data; and
      computing the result data from the field data and the model data with the prediction function;
   wherein,
      the training data is plaintext and the training result data is encrypted with a homomorphic encryption algorithm, the homomorphic encryption algorithm being additively homomorphic;
      the model data is computed in encrypted form from the plaintext training data and the encrypted training result data with the training function;
      the field data is plaintext, wherein the result data is computed in encrypted form from the plaintext field data and the encrypted model data with the prediction function, wherein two or less data types are encrypted at any given time, the datatypes including the training data, the model data, and the field data; and
   wherein, the computational model is a linear regression model, in which the prediction function is a linear function in the field data and the model data;
   wherein, the training function of the linear regression model is based on minimizing a cost function, which quadratically minimizes a difference between the prediction function and the training result data.

2. The method of claim 1, wherein the training function is a polynomial in at least one of the training data and the training result data; and wherein the prediction function is a polynomial in at least one of the field data and model data.

3. The method of claim 1, wherein each of the training data and the field data is a set of vectors or matrices of field data values; wherein each of the training result data and the result data is a vector of result data values; wherein the model data is a vector of model data values.

4. The method of claim 1, wherein, before encryption, data values are approximated by multiplication with an approximation factor and rounding to a closest integer; and wherein the homomorphic encryption algorithm is based on a finite field based on the product of two prime numbers and the approximation factor is smaller than this product.

5. The method of claim 1, wherein the training function for computing the model data is iteratively updated with the training data and the training result data; wherein in each iteration, the training function is evaluated in an evaluation server device, the updated model data is sent to a secure device, decrypted, multiplied with a convergence factor and encrypted in the secure device and sent back to the evaluation server device.

6. The method of claim 1, wherein at least one of the training data and the training result data is provided by a client device communicatively interconnected with an evaluation server device, wherein the client device encrypts at least one of the training data and the training result data and decrypts the result data and wherein the evaluation server device at least partially computes at least one of the model data and the result data; and wherein the field data is provided by at least one or a plurality of devices communicatively interconnected with the evaluation server device.

7. The method of claim 1, wherein the training data and the field data encodes at least one of local wind speed and local sunshine intensity and the training result data and the result data encodes at least one of electrical power production of wind turbine facilities and solar energy facilities.

8. A method for evaluating data based on a computational model, the computational model comprising model data, a training function and a prediction function, the method comprising:
training the computational model by:
receiving training data and training result data for training the computational model;
computing the model data from the training data and the training result data with the training function;
predicting result data by:
receiving field data for predicting result data; and
computing the result data from the field data and the model data with the prediction function;
wherein,
the training data and the training result data are encrypted with a homomorphic encryption algorithm, the homomorphic encryption algorithm being additively homomorphic;
the model data is computed in plaintext from encrypted training data and the encrypted training result data with the training function;
the field data is encrypted with homomorphic encryption algorithm, wherein the result data is computed in encrypted form from the encrypted field data and the plaintext model data with the prediction function, wherein two or less data types are encrypted at any given time, the data types including the training data, the model data, and the field data; and
wherein, the computational model is a linear regression model, in which the prediction function is a linear function in the field data and the model data;
wherein, the training function of the linear regression model is based on minimizing a cost function, which quadratically minimizes a difference between the prediction function and the training result data.

9. The method of claim 8, wherein the training function is a polynomial in at least one of the training data and the training result data; and wherein the prediction function is a polynomial in at least one of the field data and model data.

10. The method of claim 8, wherein each of the training data and the field data is a set of vectors or matrices of field data values, wherein each of the training result data and the result data is a vector of result data values; wherein the model data is a vector of model data values.

11. The method of claim 8, wherein, before encryption, data values are approximated by multiplication with an approximation factor and rounding to a closest integer; and wherein the homomorphic encryption algorithm is based on a finite field based on the product of two prime numbers and the approximation factor is smaller than this product.

12. The method of claim 8, wherein the training function for computing the model data is iteratively updated with the training data and the training result data; wherein in each iteration, the training function is evaluated in an evaluation server device, the updated model data is sent to a secure device, decrypted, multiplied with a convergence factor and encrypted in the secure device and sent back to the evaluation server device.

13. The method of claim 8, wherein at least one of the training data and the training result data is provided by a client device communicatively interconnected with an evaluation server device, wherein the client device encrypts at least one of the training data and the training result data and decrypts the result data and wherein the evaluation server device at least partially computes at least one of the model data and the result data; and wherein the field data is provided by at least one or a plurality of devices communicatively interconnected with the evaluation server device.

14. A computer-readable medium executing a computer program for evaluating data based on a computational model, the computational model comprising model data, a training function and a prediction function, which, when executed on an evaluation system, comprises:
training the computational model by:
receiving training data and training result data for training the computational model;
computing the model data from the training data and the training result data with the training function;
predicting result data by:
receiving field data for predicting result data; and
computing the result data from the field data and the model data with the prediction function;
wherein,
the training data is plaintext and the training result data is encrypted with a homomorphic encryption algorithm, the homomorphic encryption algorithm being additively homomorphic;
the model data is computed in encrypted form from the plaintext training data and the encrypted training result data with the training function;
the field data is plaintext, wherein the result data is computed in encrypted form from the plaintext field data and the encrypted model data with the prediction function, wherein two or less data types are encrypted at any given time, the data types including the training data, the model data, and the field data; and
wherein, the computational model is a linear regression model, in which the prediction function is a linear function in the field data and the model data;
wherein, the training function of the linear regression model is based on minimizing a cost function, which quadratically minimizes a difference between the prediction function and the training result data.

15. An evaluation system for evaluating data based on a computational model, the computational model comprising model data, a training function and a prediction function, which when the computational model is executed on the evaluation system, the system operable to:

train the computational model by:
  receive training data and training result data for training the computational model;
  compute the model data from the training data and the training result data with the training function;
predict result data by:
  receive field data for predicting result data; and
  compute the result data from the field data and the model data with the prediction function;
wherein,
  the training data is plaintext and the training result data is encrypted with a homomorphic encryption algorithm, the homomorphic encryption algorithm being additively homomorphic;
  the model data is computed in encrypted form from the plaintext training data and the encrypted training result data with the training function;
  the field data is plaintext, wherein the result data is computed in encrypted form from the plaintext field data and the encrypted model data with the prediction function, wherein two or less data types are encrypted at any given time, the data types including the training data, the model data, and the field data; and
  wherein, the computational model is a linear regression model, in which the prediction function is a linear function in the field data and the model data;
  wherein, the training function of the linear regression model is based on minimizing a cost function, which quadratically minimizes a difference between the prediction function and the training result data.

16. An evaluation system for evaluation data based on a computational model, the computational model comprising model data, a training function and a prediction function, which when the computational model is executed on the evaluation system, the system operable to:
  train the computational model by:
    receive training data and training result data for training the computational model;
    compute the model data from the training data and the training result data with the training function;
  predict result data by:
    receive field data for predicting result data; and
    compute the result data from the field data and the model data with the prediction function;
  wherein,
    the training data and the training result data are encrypted with a homomorphic encryption algorithm, the homomorphic encryption algorithm being additively homomorphic;
    the model data is computed in plaintext from the encrypted training data and the encrypted training result data with the training function;
    the field data is encrypted with the homomorphic encryption algorithm, wherein the result data is computed in encrypted form from the encrypted field data and the plaintext model data with the prediction function, wherein two or less data types are encrypted at any given time, the data types including the training data, the model data, and the field data; and
  wherein, the computational model is a linear regression model, in which the prediction function is a linear function in the field data and the model data;
  wherein, the training function of the linear regression model is based on minimizing a cost function, which quadratically minimizes a difference between the prediction function and the training result data.

* * * * *